United States Patent
Hilber et al.

(10) Patent No.: US 10,760,789 B2
(45) Date of Patent: Sep. 1, 2020

(54) BOILER AND A METHOD FOR $NO_x$ EMISSION CONTROL FROM A BOILER

(71) Applicant: General Electric Technology GmbH, Baden (DE)

(72) Inventors: Thomas Hilber, Kernen-Stetten (DE); Klaus Schnieder, Remseck (DE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 386 days.

(21) Appl. No.: 14/789,093

(22) Filed: Jul. 1, 2015

(65) Prior Publication Data

US 2016/0003473 A1 Jan. 7, 2016

(30) Foreign Application Priority Data

Jul. 4, 2014 (EP) ..................................... 14175813

(51) Int. Cl.
*F23J 15/04* (2006.01)
*B01D 53/34* (2006.01)
(Continued)

(52) U.S. Cl.
CPC ............ *F23J 15/04* (2013.01); *B01D 53/346* (2013.01); *B01D 53/56* (2013.01); *B01D 53/79* (2013.01);
(Continued)

(58) Field of Classification Search
CPC .. F23J 15/04; F23J 7/00; F23J 2215/10; F23J 2215/101; F34J 2219/20; B01D 53/54;
(Continued)

(56) References Cited

U.S. PATENT DOCUMENTS 5,098,680 A * 3/1992 Fellows ................. B01D 53/56
423/235
5,237,939 A * 8/1993 Spokoyny .......... B01D 53/8631
110/203
(Continued)

FOREIGN PATENT DOCUMENTS

CN 202207547 U 5/2012
CN 2102625891 A 8/2012
(Continued)

OTHER PUBLICATIONS

Office Action issued in connection with corresponding EP Application No. 14175813.6 dated Jan. 4, 2018.
(Continued)

*Primary Examiner* — David J Laux
(74) *Attorney, Agent, or Firm* — Grogan, Tuccillo & Vanderleeden, LLP

(57) ABSTRACT

A boiler includes an enclosure having at least a supply for fuel and oxidizer and at least a supply for a SNCR reagent. The supply for the SNCR reagent includes at least a regulation valve for the SNCR reagent. The boiler includes at least a sensor for measuring information indicative of the $NO_x$ concentration over at least one given enclosure cross section. The boiler includes a controller connected to the at least a sensor and to the at least a regulation valve. The controller regulates the SNCR reagent supply according to the measured information indicative of the $NO_x$ concentration.

15 Claims, 3 Drawing Sheets

(51) Int. Cl.
*B01D 53/56* (2006.01)
*B01D 53/79* (2006.01)
*F23J 7/00* (2006.01)

(52) U.S. Cl.
CPC ......... *F23J 7/00* (2013.01); *B01D 2251/2062* (2013.01); *B01D 2251/2067* (2013.01); *B01D 2258/0283* (2013.01); *F23J 2215/10* (2013.01); *F23J 2219/20* (2013.01)

(58) Field of Classification Search
CPC ...... B01D 53/56; B01D 53/565; B01D 53/58; B01D 53/79; B01D 2251/2062; B01D 2251/2067; B01D 2258/0283
See application file for complete search history.

(56) References Cited

U.S. PATENT DOCUMENTS

| | | | |
|---|---|---|---|
| 5,681,536 A | 10/1997 | Swoboda et al. | |
| 5,915,310 A | 6/1999 | Hura et al. | |
| 7,374,736 B2* | 5/2008 | Payne | B01D 53/56 423/235 |
| 7,622,093 B2* | 11/2009 | Arrol | B01D 53/56 423/210 |
| 7,736,608 B2* | 6/2010 | Eiteneer | B01D 53/8631 423/235 |
| 8,010,236 B2* | 8/2011 | Jambhekar | B01D 53/9431 422/62 |
| 8,695,516 B2* | 4/2014 | Nijhawan | B01D 53/83 110/345 |
| 8,748,187 B2* | 6/2014 | Yamaura | B01D 53/8625 422/105 |
| 8,763,540 B2* | 7/2014 | Halter | B01D 53/56 110/345 |
| 2003/0109047 A1* | 6/2003 | Valentine | B01D 53/79 436/55 |
| 2005/0051067 A1 | 3/2005 | Marx et al. | |
| 2005/0058958 A1* | 3/2005 | Kobayashi | F23C 5/32 431/10 |
| 2009/0047199 A1* | 2/2009 | Arrol | B01D 53/56 423/210 |
| 2009/0188449 A1* | 7/2009 | Fawcett | F23C 1/12 123/3 |
| 2010/0058962 A1 | 3/2010 | Halter | |
| 2010/0203461 A1* | 8/2010 | Maly | F23C 6/045 431/9 |
| 2011/0045422 A1 | 2/2011 | Tanca | |
| 2011/0302901 A1* | 12/2011 | Xu | F23C 5/32 60/39.01 |

FOREIGN PATENT DOCUMENTS

| | | |
|---|---|---|
| CN | 102921284 A | 2/2013 |
| DE | 196 18 384 A1 | 11/1997 |
| EP | 2 121 167 A1 | 11/2009 |
| WO | 02/04349 A1 | 1/2002 |
| WO | 03/039737 A1 | 5/2003 |
| WO | 2007/061401 A2 | 5/2007 |

OTHER PUBLICATIONS

Unofficial translation of Chinese Search Report issued in connection with corresponding CN Application No. 201510383730.9 dated Jun. 20, 2018.
Office Action Issued in connection with corresponding CN Application 201510383730.9 dated Mar. 28, 2019.
European Search Report from corresponding EP Application 14175813 dated Dec. 11, 2014.

* cited by examiner

BOILER AND A METHOD FOR NO$_x$ EMISSION CONTROL FROM A BOILER

CROSS-REFERENCE TO RELATED APPLICATIONS

This application claims priority to EP application No. 14175813.6 filed Jul. 4, 2014, the contents of which are hereby incorporated in its entirety.

TECHNICAL FIELD

The present invention relates to a boiler and a method for NO$_x$ emission control from a boiler. The boiler can for example be a boiler of a power plant; other applications are anyhow possible. In addition the boiler can be any type of boiler, in the drawings a tower boiler is shown only as an example.

BACKGROUND

Combustion of fossil fuel causes NO$_x$ emissions. NO$_x$ negatively impact the environment, for example by generating smog and acid rain. NO$_x$ emissions must thus be counteracted.

A number of technologies exist to counteract NO$_x$ emissions, these include:

combustion control systems for low NO$_x$ emissions;

selective catalytic reduction technology (SCR). This technology provides for supply of a reagent in the combustion gas and its reaction with NO$_x$ at a temperature between 300 and 400° C. and in the presence of a catalyst to convert NO$_x$ into N$_2$ and water;

selective non-catalytic reduction technology (SNCR).

This technology provides for a reagent supply into the combustion gas and its reaction with NO$_x$ at a temperature between 800-1000° C. to convert the NO$_x$ into N$_2$ and water. In this case, no catalyst is provided.

U.S. Pat. No. 5,681,536 discloses a lance for injecting air and a reagent for SNCR into a boiler.

US 2005/0 051 067 discloses a boiler with burners and nozzles for overfire air injection (i.e. injection of a part of the combustion air in the furnace above the burner belt to enhance primary NOx reduction). A reagent for SNCR is supplied together with the overfire air into the furnace.

WO 02/04349 discloses to inject overfire air and a SNCR reagent into a boiler, and contacting the combustion gas with the overfire air and SNCR reagent to decrease the concentration of nitrogen oxides therein. The reagent is provided in an aqueous solution or powder which is injected into the furnace with the overfire air.

The known technologies imply a large reagent consumption and thus large costs associated to the reagent.

SUMMARY

An aspect of the invention includes providing a boiler and a system in which the amount of reagent that is consumed during operation is reduced with respect to existing technologies and is optimized for the specific combustion gas being treated.

These and further aspects are attained by providing a boiler and a method in accordance with the accompanying claims.

BRIEF DESCRIPTION OF THE DRAWINGS

Further characteristics and advantages will be more apparent from the description of a preferred but non-exclusive embodiment of the boiler and method, illustrated by way of non-limiting example in the accompanying drawings, in which.

DETAILED DESCRIPTION OF EXEMPLARY EMBODIMENTS

Figure 1:
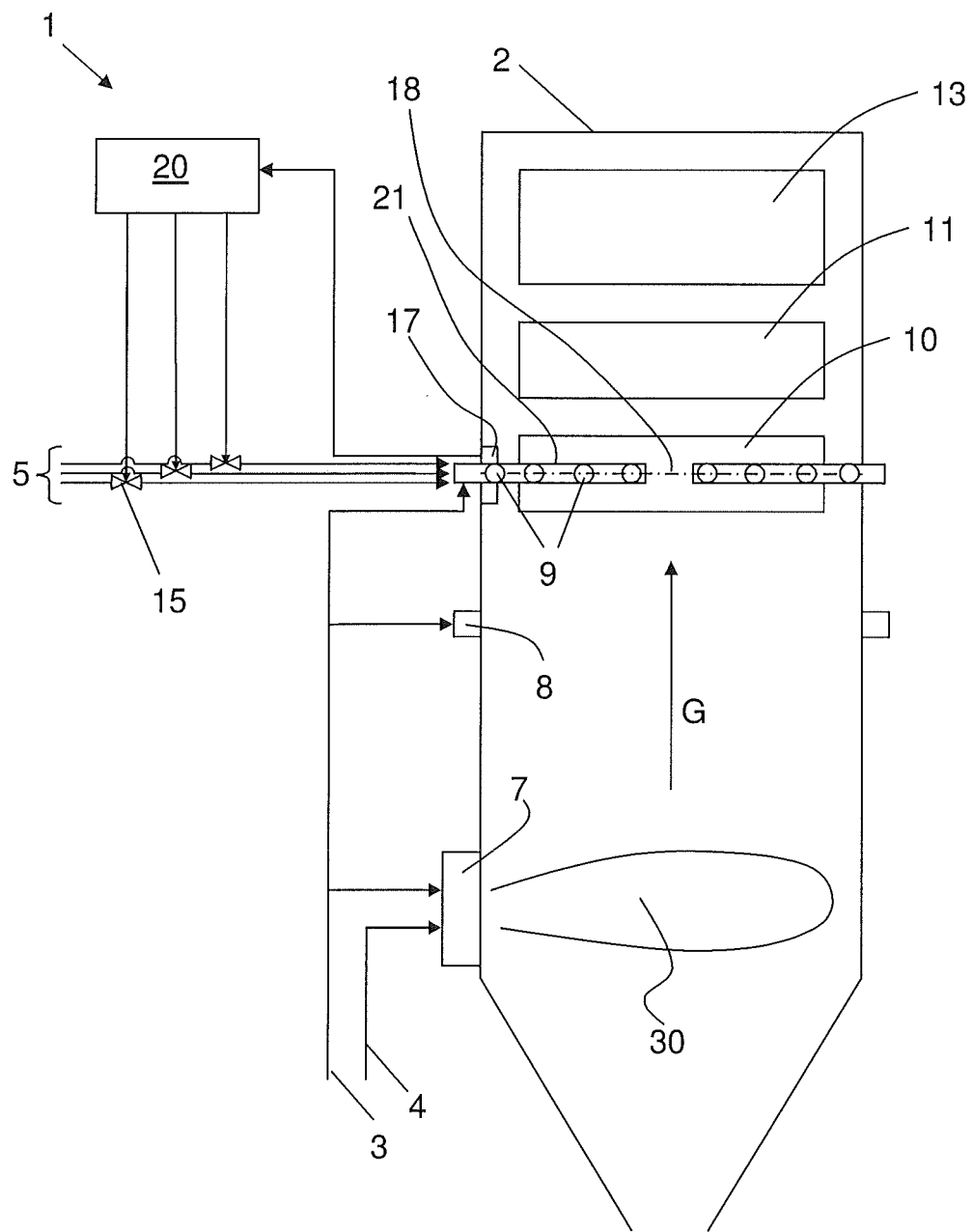
FIG. 1 shows a boiler in one embodiment of the invention.
Figure 2:
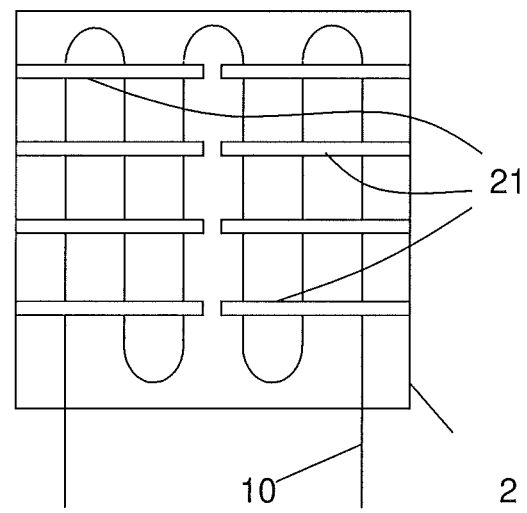
FIG. 2 shows a cross section through plane 18 of FIG. 1.
Figure 3:
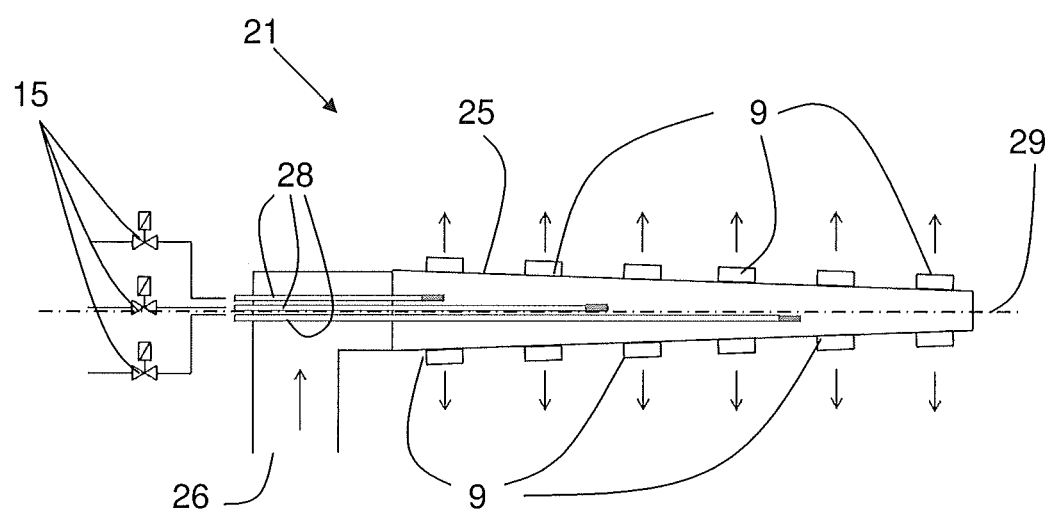
FIG. 3 shows a schematic longitudinal section of a lance.

With reference to the figures, these show a boiler 1 comprising an enclosure 2 having at least a supply for fuel and oxidizer 3, 4 and at least a supply for a SNCR reagent 5.

For example, the supply 3 for fuel can include ducting connected to burners 7 such as round burners and the fuel to be used can be a solid fuel such as coal or lignite or other solid fuel, liquid fuel such as oil or gas fuel. Preferably the fuel is solid fuel.

The oxidizer can be in different examples air or oxygen or mixtures of air and oxygen or other appropriate oxidizers. The oxidizer is typically supplied into the boiler in stages and in this respect the total combustion oxidizer is typically divided in combustion oxidizer that is supplied via the burners 7 and oxidizer overfire that is supplied downstream of the burners 7 (with respect of the flue gas flow through the enclosure 2). FIG. 1 shows a first and a second overfire supply; their number can anyhow be any according to the needs. The supply 4 for oxidizer consequently can include ducting connected to the burners 7 (that are used for supply of fuel and oxidizer) and nozzles 8, 9 for the oxidizer overfire supply.

The enclosure typically houses heat exchanging surfaces, such as a superheater 10, a reheater 11 and an economizer 13. It is clear that one or more among the superheater 10, the reheater 11 and the economizer 13 could not be provided according to the needs.

The supply for the SNCR reagent 5 comprises regulation valves 15 for regulating the mass flow of SNCR reagent that is supplied into the enclosure 2.

In addition, the boiler 1 comprises one or more sensors for measuring an information indicative of the NO$_x$ concentration over at least one given enclosure cross section 18 (such as the flue gas temperature field), and a controller 20 connected to the sensors 17 and the regulation valves 15 for regulating the SNCR reagent supply according to the measured information indicative of the NO$_x$ concentration.

Preferably, the supply for a SNCR reagent comprises lances 21 that project into and are housed in the enclosure 2.

In addition, preferably the lances 21 are also connected to the oxidizer supply. In this respect, the oxidizer supply is preferably an oxidizer overfire supply.

The lances 21 include an elongated body 25 with an entrance 26 for oxidizer and the nozzles 9; in addition, one or more injectors 28 for SNCR reagent are housed within the elongated body 25. Alternatively (but this is not a preferred solution) it is also possible to have the entrance 26 for the SNCR reagent and injectors 28 for the oxidizer.

In a preferred solution shown in the figures, the lance 21 comprises a number of injectors 28 housed at different longitudinal positions over the lance length (i.e. over the lance dimension along the longitudinal lance axis 29).

The sensor 17 can be a temperature sensor, but any other kind of sensors can be used able to give an indication of the local $NO_x$ concentration. For example an acoustic sensor can be used, but other types of sensors can be used as well. The temperature of the combustion gas gives an indication of the $NO_x$ concentration, because the higher the local temperature, the higher the local $NO_x$ concentration.

The controller 20 can be a dedicated controller including dedicated hardware and/or software or the controller can be implemented or embedded in the controller of the boiler or power plant; also in this last case the controller can include dedicated hardware and/or software, but it is preferably implemented via software.

In a preferred embodiment, the lances 21 are mechanically connected to and supported by the heat exchanging surfaces, i.e. superheater 10 and/or reheater 11 and/or economizer 13; the specific location for the lances can be selected according to the temperature of the combustion gas, i.e. the lances 21 are positioned at a cross section of the enclosure 2 where the combustion gas has a temperature in the range 750-1100° C. and preferably 800-1000° C. for SNCR.

For example the boiler can be advantageously implemented by retrofitting an existing boiler having overfire lances, and replacing the existing overfire lances with the lances 21; in addition the controller 20 and sensors 17 also must be provided.

The operation of the boiler is apparent from that described and illustrated and is substantially the following.

Fuel such as lignite and oxidizer such as air are supplied via fuel supply 4 and oxidizer supply 3 and via the burners 7, such that the fuel is combusted generating a flame 30.

The combustion gas G rises through the enclosure 2 dragging a certain amount of uncombusted material, typically carbon monoxide, that reacts with the first overfire air supplied via the nozzles 8, typically without flame generation but with heat release.

The combustion gas then passes around the superheater 10, reheater 11 and economizer 13 and heats the water/steam passing through these components. Exhaust combustion gas is than discharged from the top of the enclosure; for example it can be forwarded into a gas treatment system and then discharged into the atmosphere.

From the nozzles 9 of the lances 21 additional overfire air is supplied into the enclosure 2. This air causes reaction of the uncombusted material dragged by the combustion gas without flame but with heat release. In addition, also a SNCR reagent is injected together with air.

The SNCR reagent can for example be ammonia or urea or other types of reagents known in the art. The reagent is injected in liquid state from the injectors 28 within the lance 25. Injection causes atomization and dispersion of the reagent and evaporation of the reagent, helped by the high temperature of the overfire air, before it is supplied into the enclosure via the nozzles 9 together with overfire air.

When the reagent is expelled from the lances 21 it mixes with the combustion gas and causes $NO_x$ conversion into $N_2$ and water.

Advantageously, the temperature sensors 17 measure the temperature such that the controller is able to identify the temperature over a given enclosure cross section 18; the temperature is indicative of the local $NO_x$ content over the given cross section 18.

The controller 20 thus drives the valves 15 such that reagent is locally injected according to the local $NO_x$ content of the combustion gas.

Figure 4:
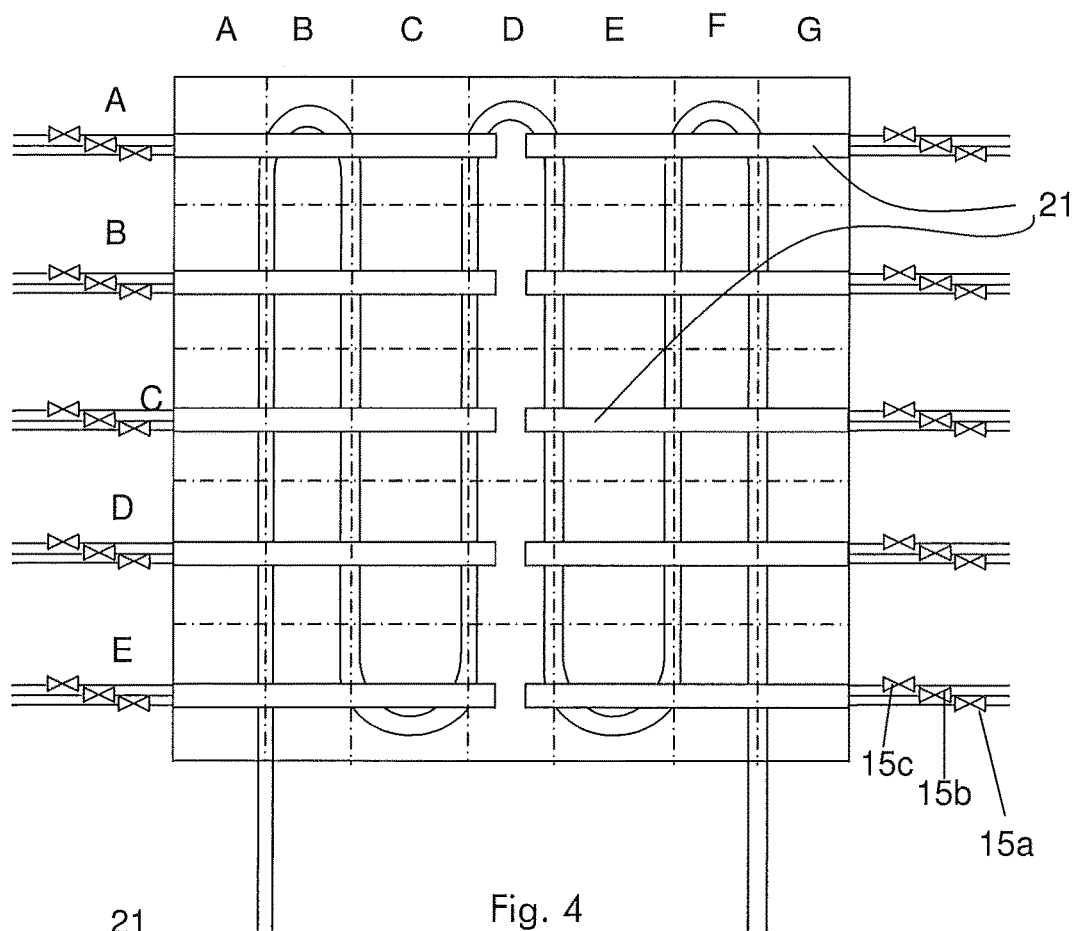
FIG. 4 shows an enlarged cross section through line 18 of FIG. 1.
Figure 5:
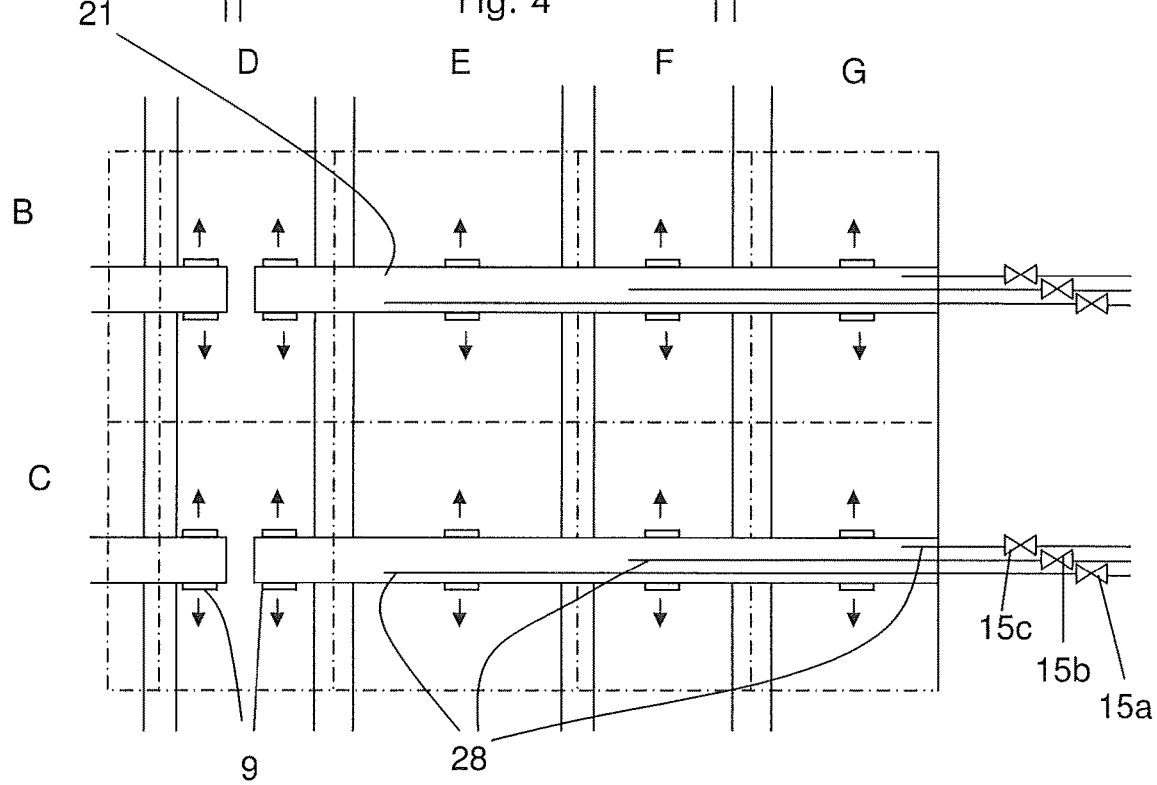
FIG. 5 shows an enlarged part of FIG. 4.

FIG. 4 shows the cross section 18 and identifies a number of zones (indicated by letters from AA to GE, with the first letter referring to the column and the second to the row) whose temperature is measured and $NO_x$ concentration is indirectly known. Supposing for example that the temperature measured at the zone DC is high while at the zones EC, FC and GC is lower, the controller 20 drives the corresponding valve 15*a* in order to supply a greater mass flow of reagent and the valves 15*b* and 15*c* to supply a lower mass flow of reagent. This causes injection of a larger amount of reagent in the zone DC where the temperature is higher and thus the $NO_x$ concentration is higher and a lower reagent mass flow injection at the zones EC, FC and GC where the $NO_x$ concentration is lower and thus a less SNCR reagent is needed for $NO_x$ removal.

For example, look up tables can be defined in which the average temperature or average temperature ranges are correlated with a given reagent mass flow. This way once the average temperature of a zone is measured, the controller 20 can drive the valves 15*a-c* on the basis of the look up table in order to inject into each zone the required reagent mass flow.

The present invention also refers to a method for $NO_x$ emission control from a boiler.

The method comprises measuring information indicative of the $NO_x$ concentration over at least one given enclosure cross section 18, and regulating the SNCR reagent supply according to the measured information indicative of the $NO_x$ concentration, thus injecting the reagent into the enclosure.

Preferably measuring includes locally measuring information indicative of the $NO_x$ concentration over at least one given enclosure cross section over a number of zones AA-GE, and regulating includes regulating the SNCR reagent supply according to the measured information indicative of the $NO_x$ concentration in each zone AA-GE.

For example, locally measuring includes measuring a plurality of information over at least a cross section 18 of the enclosure 2.

The method can also comprise mixing the SNCR reagent with oxidizer such as air and injecting the mixture and measuring information indicative of the $NO_x$ concentration includes measuring at least a temperature.

Naturally the features described may be independently provided from one another.

In practice the materials used and the dimensions can be chosen at will according to requirements and to the state of the art.

The invention claimed is:

1. A boiler comprising:
   an enclosure having a supply for fuel and oxidizer and a supply for a SNCR reagent, wherein the supply for the SNCR reagent includes a regulation valve for the SNCR reagent;
   a plurality of sensors, each sensor for measuring an information indicative of the NOx concentration over a respective enclosure cross section transverse to flue gas flow;
   a controller connected to the plurality of sensors and to the regulation valve; the controller for regulating the SNCR reagent supply according to the measured information indicative of the NOx concentration;
   wherein the supply for a SNCR reagent comprises a plurality of lances, each lance housed in the enclosure and arranged across a respective cross section of the enclosure transverse to flue gas flow and comprising a plurality of injectors disposed at different longitudinal positions over the lance length; and
   wherein the supply for fuel and oxidizer provides an oxidizer in a plurality of stages at different positions in the enclosure relative to a flue gas flow direction, wherein the plurality of stages are downstream of a burner relative to the flue gas flow direction;

wherein each lance includes an elongated body with at least one entrance for oxidizer or SNCR reagent and nozzles, wherein at least an injector for the SNCR reagent or oxidizer is housed within the elongated body;

wherein the entrance is connected to the supply for oxidizer and the at least an injector is connected to the supply for the SNCR reagent, wherein the plurality of lances is also connected to the supply for oxidizer, and the supply for oxidizer is an oxidizer overfire supply, wherein the controller adjusts an amount of SNCR reagent at each lance of the plurality independently of the other lances of the plurality; and wherein the enclosure houses at least one of a superheater, a reheater and/or an economizer, wherein at least one lance of the plurality is mechanically connected to and supported by two or more spaced apart portions of the at least one of the superheater, the reheater and/or the economizer after entering the enclosure.

2. The boiler of claim 1, wherein the sensor is a temperature sensor.

3. The boiler of claim 1, wherein at least one of: a portion of the plurality of lances; a portion of the plurality of sensors; and the controller are part of a retrofit to an existing boiler system.

4. The boiler of claim 1, wherein the existing boiler system includes overfire lances.

5. The boiler of claim 1, wherein at least one of the plurality of lances is positioned at a cross section of the enclosure based on a temperature of the flue gas.

6. The boiler of claim 1, wherein the at least one of the plurality of lances is positioned based on a flue gas temperature in a range of 750° C. to 1100° C.

7. A method for NOx emission control from a boiler,
wherein the boiler includes an enclosure having at least a supply for fuel and oxidizer and at least a supply for a SNCR reagent comprising a regulation valve for the SNCR reagent and a plurality of lances, each lance arranged across a respective cross section of the enclosure transverse to flue gas flow and comprising a plurality of injectors disposed at different longitudinal positions over the lance length, wherein the plurality of lances is also connected to the supply for oxidizer, and the supply for oxidizer is an oxidizer overfire supply;

an enclosure having a supply for fuel and oxidizer and a supply for a SNCR reagent, wherein the supply for the SNCR reagent includes a regulation valve for the SNCR reagent;

wherein the supply for fuel and oxidizer provides an oxidizer in a plurality of stages at different positions in the enclosure relative to a flue gas flow direction, wherein the plurality of stages are downstream of a burner relative to the flue gas flow direction;

wherein each lance includes an elongated body with at least one entrance for oxidizer or SNCR reagent and nozzles, wherein at least an injector for the SNCR reagent or oxidizer is housed within the elongated body;

wherein the entrance is connected to the supply for oxidizer and the at least an injector is connected to the supply for the SNCR reagent, the method comprising:
measuring an information indicative of the NOx concentration over an enclosure cross section transverse to flue gas flow;

providing an oxidizer via the supply for fuel and oxidizer, in a plurality of stages at different positions in the enclosure relative to a flue gas flow direction, wherein the plurality of stages are downstream of a burner relative to the flue gas flow direction;

regulating the SNCR reagent supply, according to the measured information indicative of the NOx concentration, at each lance of the plurality independently of the other lances of the plurality;

injecting the reagent into the enclosure; and wherein the enclosure houses heat exchanging surfaces downstream from a main burner zone, the heat exchanging surfaces including at least one of a superheater, a reheater and/or an economizer, wherein at least one lance of the plurality is mechanically connected to and supported by two or more spaced apart portions of the at least one of the superheater, the reheater and/or the economizer after entering the enclosure.

8. The method of claim 7, wherein measuring includes locally measuring information indicative of the NOx concentration over respective enclosure cross section over a number of zones; and
the regulating includes regulating the SNCR reagent supply according to the measured information indicative of the NOx concentration in each zone.

9. The method of claim 8, wherein the locally measuring includes measuring a plurality of information over a respective cross section of the enclosure over a number of zones.

10. The method of claim 7, further comprising mixing the SNCR reagent with oxidizer and injecting the mixture.

11. The method of claim 7, wherein the measuring information indicative of the NOx concentration includes measuring at least a temperature.

12. The method of claim 7, wherein at least one of: a portion of the plurality of lances; a portion of the plurality of sensors; and the controller are part of a retrofit to an existing boiler system.

13. The method of claim 7, wherein the existing boiler system includes overfire lances.

14. The method of claim 7, wherein at least one of the plurality of lances is positioned at a cross section of the enclosure based on a temperature of the flue gas.

15. The method of claim 7, wherein the at least one of the plurality of lances is positioned based on a flue gas temperature in a range of 750° C. to 1100° C.

* * * * *